(No Model.)
F. G. TAYLOR.
BICYCLE SUPPORT.
No. 456,347. Patented July 21, 1891.
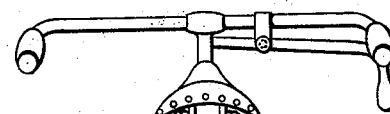
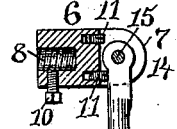
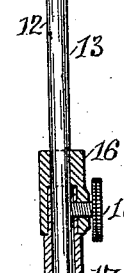
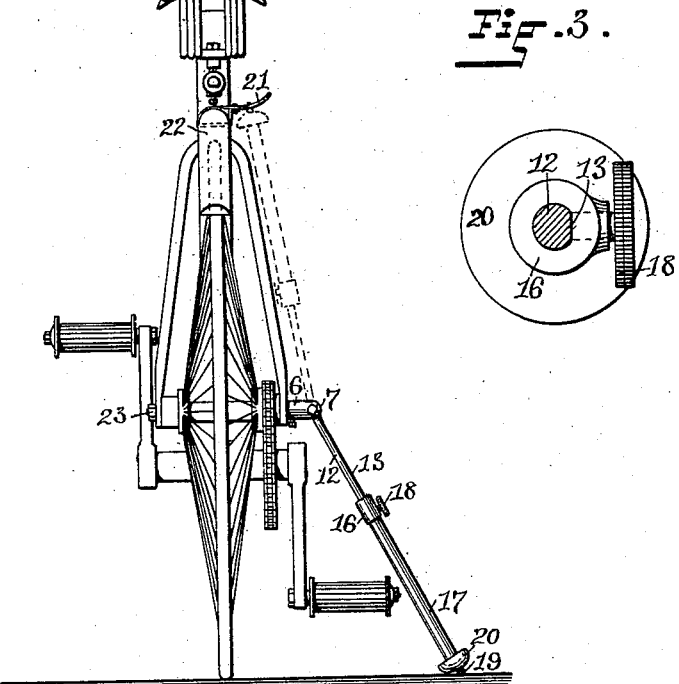
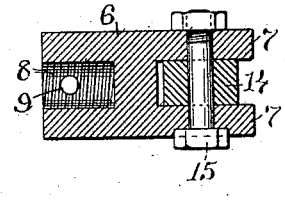
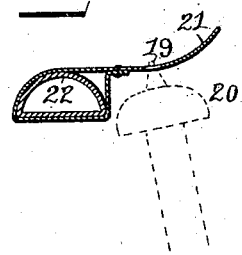
WITNESSES:
Henry J. Miller
Chas. H. Luther Jr.
INVENTOR:
Fredrick G. Taylor
by Joseph A. Miller & Co
Attorneys

UNITED STATES PATENT OFFICE.

FREDERICK G. TAYLOR, OF CRANSTON, RHODE ISLAND.

BICYCLE-SUPPORT.

SPECIFICATION forming part of Letters Patent No. 456,347, dated July 21, 1891.

Application filed March 19, 1891. Serial No. 385,582. (No model.)

*To all whom it may concern:*

Be it known that I, FREDERICK G. TAYLOR, of Cranston, in the county of Providence and State of Rhode Island, have invented certain new and useful Improvements in Bicycle-Supports; and I hereby declare that the following is a full, clear, and exact description of the same, reference being had to the accompanying drawings, forming part of this specification.

This invention has reference to improvements in supports for bicycles and in means for securing the same thereto.

The object of this invention is to provide a new and useful device for supporting bicycles in an upright position, which can be detachably secured to the bicycle-frame or to the axle of the rear wheel, and can be conveniently carried on the bicycle in a position which will not interfere with the movements of the rider.

To attain these ends my invention consists in certain novel features of construction and peculiar combination of parts, which will hereinafter be more fully described, and pointed out in the claims.

Figure 1 is a rear view of a bicycle, showing the improved supporting device secured to the axle of the rear wheel and in position to support the bicycle. Fig. 2 is an enlarged and partly sectional view of the supporting device removed from the bicycle. Fig. 3 is an end view of the same, taken at a line *a b*, Fig. 2, the rod being shown in cross-section.
Fig. 4 is a longitudinal sectional view of the clamping-socket, showing the rod pivotally attached thereto. Fig. 5 is a sectional view of the bicycle-frame and the spring-latch by which the supporting device may be held in an upright position when not in use.

Similar numbers of reference designate corresponding parts throughout.

In the drawings, 6 is a clamping-socket having the projections 7 7 and screw-threaded socket 8, in one wall of which is formed a threaded perforation 9 to receive the binding-screw 10. Between the projections 7 7 are adjustably secured the set-screws 11 11, which are adapted to adjust the angle of the supporting device. The rod 12 is of a cross-section (shown in Fig. 3) having a flattened surface 13 extending nearly the length of the rod, and at its upper end 14 is flattened at the sides to a thickness slightly greater than the space between the projections 7 7 of the clamping-socket 6, so that it is necessary to spring the projections apart when the end 14 is placed between them, when it is pivotally secured by the bolt 15, passing through suitable perforations in the projections 7 7 and flat end 14 of the rod 12. This bolt 15 may be tightened by a nut to take up the wear of the flat end 14 and to clamp the same between the projections 7 7. The sleeve 16 is secured to the upper end of the tube 17 and has an axial perforation of a cross-section corresponding to the cross-section of the rod 12, which sleeve 16 slides thereon and is secured at any point in its length by the thumb-screw 18, working in a suitable threaded perforation in the wall of the sleeve 16. The lower end of the tube 17 is provided with an interior screw-thread to engage with the thread cut on the spur 19, which is screwed therein for a portion of its length. Over the exposed end of the spur 19 is screwed the knob 20, having a central screw-threaded perforation. This knob is screwed tightly onto the spur 19 and against the end of the tube 17, forming a lock-nut to hold the spur 19 in place. The latching device 21 is made of a strip of spring metal, one end of which is bent to encircle the frame 22 of the bicycle, the return end being clamped by a small bolt to the center of the strip, and the free end of the strip being bent slightly upward and provided with a perforation to engage the point of the spur 19. This latching device may be dispensed with, however, as the grasp of the projections 7 7 on the end 14 of the rod 12 will generally be sufficient to support the rod in any position in which it may be placed.

In securing my improved supporting device to a bicycle I prefer to use the clamping-sockets 6. The nut 23, which is generally screwed onto the end of the axle, is first removed, and the clamping-socket screwed on in its place and set by the set-screws 10. The supporting device may, however, be secured by any other well-known means, such as a screw passing axially through the clamping-socket and entering a threaded hole in the end of the axle; or the threaded socket 8 may be omitted and a clamp formed in place thereof, whereby the device may be clamped to the frame of the bicycle.

I do not wish to confine myself to the use of the sleeve 16 and tube 17, sliding on the rod 12, as in practice I find that this sleeve and tube may be dispensed with and the rod 12 made long enough to support the bicycle. In this case I would provide the lower end of the rod 12 with a suitable spur.

Having thus described my invention, I claim as new and desire to secure by Letters Patent—

1. The combination, with the rear axle of a bicycle, of a screw-socket clamping device adapted to be secured thereto and provided with a supporting-rod pivotally secured in such clamping device, as and for the purpose described.

2. The combination, with the rear axle of a bicycle, of the clamping device 6, having the screw-threaded socket 8, binding-screw 10, set-screws 11 11, and projections 7 7, and a supporting-rod 12, pivotally secured between the projections 7 7 by the bolt 15 and adapted to be held in an upright position by the pressure of the projections, as described.

3. In a bicycle-support, the combination, with the clamping device 6, having the projections 7 7, and the rod 12, having the flattened side 13, pivotally secured between such projections, of the sleeve 16, secured to the upper end of the tube 17 and having an axial perforation of the same cross-section as the cross-section of the rod 12, the thumb-screw 18, working in a perforation in the wall of the sleeve 16, adapted to bind against the flattened side of the rod 12, and the spur 19 and knob 20, secured to the lower end of the tube 17, as described.

FREDERICK G. TAYLOR.

Witnesses:
HENRY J. MILLER,
M. F. BLIGH.